United States Patent
Barak et al.

(10) Patent No.: US 9,331,969 B2
(45) Date of Patent: May 3, 2016

(54) OCCASIONALLY-CONNECTED COMPUTING INTERFACE

(71) Applicant: LivePerson, Inc., New York, NY (US)

(72) Inventors: Matan Barak, Ra'anana (IL);
Arnon-Naftally Kehat, Zoran (IL);
Noam Yagil, Timrat (IL)

(73) Assignee: Liveperson, Inc., New York, NY (US)

( * ) Notice: Subject to any disclaimer, the term of this patent is extended or adjusted under 35 U.S.C. 154(b) by 0 days.

(21) Appl. No.: 14/322,736

(22) Filed: Jul. 2, 2014

(65) Prior Publication Data
US 2015/0012848 A1    Jan. 8, 2015

Related U.S. Application Data

(63) Continuation of application No. 13/413,197, filed on Mar. 6, 2012, now Pat. No. 8,805,941.

(51) Int. Cl.
*H04L 12/58* (2006.01)
*H04W 4/14* (2009.01)
*H04M 1/725* (2006.01)

(52) U.S. Cl.
CPC .......... *H04L 51/046* (2013.01); *H04M 1/72552* (2013.01); *H04W 4/14* (2013.01)

(58) Field of Classification Search
CPC ... H04L 51/046; H04M 1/72552; H04W 4/14
USPC ........................................................ 709/206
See application file for complete search history.

(56) References Cited

U.S. PATENT DOCUMENTS

| 4,881,261 A | 11/1989 | Oliphant et al. |
| 5,187,735 A | 2/1993 | Herrero Garcia et al. |

(Continued)

FOREIGN PATENT DOCUMENTS

| EP | 840244 A1 | 5/1998 |
| EP | 1233361 A1 | 8/2002 |

(Continued)

OTHER PUBLICATIONS

Final Office Action of Jul. 31, 2015 for U.S. Appl. No. 14/317,346, 13 pages.

(Continued)

*Primary Examiner* — Kevin Bates
*Assistant Examiner* — Nazia Naoreen
(74) *Attorney, Agent, or Firm* — Kilpatrick Townsend & Stockton LLP

(57) ABSTRACT

Described are computer-based methods and apparatuses, including computer program products, for allowing a user to switch between interfacing with a service through a network or through short message service (SMS). A chat service is executed through which a first user at a first computer can communicate directly with a second user at a second computer. A request is received from the first computer to enable the first user to interface with the chat service through a mobile device of the first user using SMS instead of through the network using the first computer. The chat service is configured to interface with the mobile device through SMS, including communicating chat information through SMS to the first user's mobile device, and communicating control information through SMS to the first user's mobile device such that the first user can control a full functionality of the chat service using SMS.

21 Claims, 4 Drawing Sheets

(56) References Cited

U.S. PATENT DOCUMENTS

| | | |
|---|---|---|
| 5,206,903 A | 4/1993 | Kohler et al. |
| 5,208,748 A | 5/1993 | Flores et al. |
| 5,235,519 A | 8/1993 | Miura |
| 5,239,462 A | 8/1993 | Jones et al. |
| 5,262,941 A | 11/1993 | Saladin et al. |
| 5,289,371 A | 2/1994 | Abel et al. |
| 5,319,542 A | 6/1994 | King et al. |
| 5,351,186 A | 9/1994 | Bullock et al. |
| 5,372,507 A | 12/1994 | Goleh |
| 5,375,055 A | 12/1994 | Togher et al. |
| 5,387,783 A | 2/1995 | Mihm et al. |
| 5,450,537 A | 9/1995 | Hirai et al. |
| 5,517,405 A | 5/1996 | McAndrew et al. |
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra at al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen at al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et at |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A | 11/2000 | England |

(56) References Cited

U.S. PATENT DOCUMENTS

| | | |
|---|---|---|
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,535,492 B2 | 3/2003 | Shtivelman |
| 6,542,936 B1 | 4/2003 | Mayle e al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shaflee et al. |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat at al. |
| 7,536,320 B2 | 5/2009 | McQueen et al. |
| 7,552,080 B1 | 6/2009 | Willard et al. |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,185,544 B2 | 5/2012 | Oztekin at at |
| 8,260,846 B2 | 9/2012 | Lahav |
| 8,266,127 B2 | 9/2012 | Mattox et al. |
| 8,386,340 B1 | 2/2013 | Feinstein |
| 8,392,580 B2 * | 3/2013 | Allen et al. .......... 709/227 |
| 8,738,732 B2 | 5/2014 | Karidi |
| 8,762,313 B2 | 6/2014 | Lahav et al. |
| 8,799,200 B2 | 8/2014 | Lahav |

(56) References Cited

U.S. PATENT DOCUMENTS

| | | |
|---|---|---|
| 8,805,844 B2 | 8/2014 | Schorzman et al. |
| 8,805,941 B2 | 8/2014 | Barak et al. |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bemasconi |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijisinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1* | 10/2006 | Davies .................. H04L 12/587 709/229 |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0206086 A1 | 9/2007 | Baron et al. |
| 2007/0239527 A1 | 10/2007 | Nazer et al. |
| 2007/0250585 A1 | 10/2007 | Ly et al. |
| 2007/0260596 A1 | 11/2007 | Koran et al. |
| 2007/0265873 A1 | 11/2007 | Sheth et al. |

(56) References Cited

U.S. PATENT DOCUMENTS

| | | |
|---|---|---|
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1* | 5/2009 | Zhu .................. H04W 4/14 709/206 |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0307003 A1 | 12/2009 | Benyamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0205024 A1 | 8/2010 | Shachar et al. |
| 2010/0255812 A1 | 10/2010 | Nanjundaiah et al. |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0042389 A1 | 2/2012 | Bradley et al. |
| 2012/0059722 A1 | 3/2012 | Rao |
| 2012/0130918 A1 | 5/2012 | Gordon |
| 2012/0136939 A1 | 5/2012 | Stern et al. |
| 2012/0150973 A1 | 6/2012 | Barak |
| 2012/0195422 A1 | 8/2012 | Famous |
| 2012/0254301 A1 | 10/2012 | Fiero |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0132194 A1 | 5/2013 | Rajaram |
| 2013/0182834 A1 | 7/2013 | Lauffer |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0310229 A1 | 10/2014 | Lahav et al. |
| 2014/0372240 A1 | 12/2014 | Freishtat et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0278837 A1 | 10/2015 | Lahav et al. |

FOREIGN PATENT DOCUMENTS

| | | |
|---|---|---|
| EP | 1 276 064 A2 | 1/2003 |
| EP | 1 549 025 A1 | 6/2005 |
| EP | 1 840 803 A1 | 10/2007 |
| EP | 1 845 436 A2 | 10/2007 |
| EP | 1 850 284 A1 | 10/2007 |
| FR | 2 950 214 A1 | 3/2011 |
| JP | 9288453 | 11/1997 |
| JP | 2004-054533 | 2/2004 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | WO-01/27825 A1 | 4/2001 |
| WO | 01/35272 A2 | 5/2001 |
| WO | WO-02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Final Office Action of Aug. 10, 2015 for U.S. Appl. No. 13/961,072, 12 pages.

Non-Final Office Action of Aug. 14, 2015 for U.S. Appl. No. 14/543,397, 12 pages.

Non-Final Office Action of Aug. 18, 2015 for U.S. Appl. No. 14/570,963, 23 pages.

(56) References Cited

OTHER PUBLICATIONS

Non-Final Office Action of Aug. 27, 2015 for U.S. Appl. No. 11/394,078, 21 pages.
Non-Final Office Action of Sep. 11, 2015 for U.S. Appl. No. 14/500,502, 12 pages.
Final Office Action of Sep. 18, 2015 for U.S. Appl. No. 14/288,258, 17 pages.
Notice of Allowance of Sep. 18, 2015 for U.S. Appl. No. 14/244,830, 13 pages.
First Action Interview Pilot Program Pre-Interview Communication of Oct. 21, 2015 for U.S. Appl. No. 14/313,511, 3 pages.
Final Office Action of Oct. 22, 2015 for U.S. Appl. No. 13/830,719, 29 pages.
International Preliminary Report on Patentability for PCT Application No. PCT/US2013/038212, mailed Nov. 6, 2014, 8 pages.
International Preliminary Report on Patentability for PCT Application No. PCT/US2013/041147, mailed Jan. 22, 2015, 21 pages.
International Search Report and Written Opinion for PCT Application No. PCT/US14/49822, mailed Feb. 27, 2015, 11 pages.
Extended European Search Report dated Jul. 7, 2015 for European Patent Application No. 15161694.3; 8 pages.
Non-Final Office Action of Dec. 4, 2014 for U.S. Appl. No. 14/275,698, 6 pages.
Non-Final Office Action of Dec. 23, 2014 for U.S. Appl. No. 13/961,072, 11 pages.
Non-Final Office Action of Jan. 14, 2015 for U.S. Appl. No. 14/288,258, 12 pages.
Non-Final Office Action of Jan. 21, 2015 for U.S. Appl. No. 14/500,502, 8 pages.
Final Office Action of Jan. 29, 2015 for U.S. Appl. No. 14/245,400, 28 pages.
Final Office Action of Mar. 12, 2015 for U.S. Appl. No. 13/080,324, 13 pages.
Non-Final Office Action of Mar. 13, 2015 for U.S. Appl. No. 13/841,434, 26 pages.
Final Office Action of Apr. 7, 2015 for U.S. Appl. No. 11/394,078, 18 pages.
Notice of Allowance of Mar. 30, 2015 for U.S. Appl. No. 14/275,698, 11 pages.
Non-Final Office Action of Apr. 9, 2015 for U.S. Appl. No. 13/830,719, 24 pages.
Non-Final Office Action of May 7, 2015 for U.S. Appl. No. 13/829,708, 16 pages.
Final Office Action of May 8, 2015 for U.S. Appl. No. 10/980,613, 18 pages.
Non-Final Office Action of May 13, 2015 for U.S. Appl. No. 14/317,346, 21 pages.
Non-Final Office Acton of Jun. 2, 2015 for U.S. Appl. No. 12/608,117, 26 pages.
First Action Interview Pilot Program Pre-Interview Communication of Jun. 19, 2015 for U.S. Appl. No. 14/244,830, 7 pages.
Non-Final Office Action of Jul. 20, 2015 for U.S. Appl. No. 14/711,609, 12 pages.
Non-Final Office Action of Jul. 20, 2015 for U.S. Appl. No. 14/500,537, 12 pages.
Chartrand Sabra, "A new system seeks to ease the bottleneck in the customer-service information highway" New York Times (Apr. 30, 2001) p. 12, col. 4.
Just Answer (2004 Faq) Archive.org cache of www.justanswer.com circa (Dec. 2004).
Pack Thomas, "Human Search Engines the next Killer app," (Dec. 1, 2000) Econtent DBS vol. 23; Issue 6 p. 16.
Match.com "Match.com Launches Match.com Advisors," PR Newswire (Oct. 14, 2003).
SITEL, "SITEL to Provide Live Agent Support Online for Expertcity.com," PR Newswire (Feb. 28, 2000).
Webmaster World, "Link to my website is in a frame with banner ad at the top," (Nov. 11, 2003) www.webmasterworld.com.

Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
Fairisaac, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009).
"Oauth core 1.0 Revision A," [XP002570263] Jun. 24, 2009, Oauth Core Workgroups pp. 1-27 www.ouath.net/core/1.0a/) retrieved Jun. 24, 2009.
PRN: "First American Financial Acquires Tele-Track Inc.,"PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Richardson et al., "Predicting Clicks: Estimating the Click-Through Rate for New Ads," (May 2007).
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Inforamtionweek, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.

(56) References Cited

OTHER PUBLICATIONS

Fiszer, Max; "Customizing an inbound call-center with skills-based routing," Telemarketing & Call Center Solutions, (Jan. 1997), v15i7 p. 24; Proquest #11267840, 5 pages.
redhat_.com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_ File 621:New Product Announcement, 3 pages.
Handley, John, "Credit Review Lets the Numbers Do the Talking in Home Mortgage Game", Chicaao Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialoa File 625:American Banker Publications, (Mar. 21, 1982) 2 pages.
"What the Credit Bureau is Saying About You: If a Mistake Sneaks Into Your Record, You May Not Know About it Until You Get Turned Down for Credit", Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
"What Do FICO Scores Mean to Me?", http://www.sancap.com. (1999) 3 pages.
"What is a FICO Score?", http://www.aspeenloan.com (2009) 1 page.
"Credit", The New Encyclopaedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, p. 58 (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.

Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n. 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-inc.com/news/pr_040198.htm (Apr. 1, 1998) 2 pages.
Staff, "On-Line System Approves Loans While Customer Waits"— Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action issued Oct. 8, 2008, 14 pages.
"Sample Experian Credit Report" by Consumer Information consumerinfo.com (Jul. 9, 1998) 4 pages.
Plaintiffs Original Complaint, *Nextcard, LLC* v. *Liveperson, Inc.*; Civil Action No. 2:08-cv-00184-TJW, In the U.S. District Court for the Eastern District of Texas, Marshall Division, filed Apr. 30 2008 (7 pages).
Amended Complaint and Jury Demand; *Liveperson, Inc.* v. *Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC* v. *American Express Company, et al*; Civil Action No. 2:07-cv-354 (TJW); In the

(56) References Cited

OTHER PUBLICATIONS

U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Compalint; *Nextcard, LLC v. American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; *Nextcard, LLC v. American Express Company, et al*; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC v. American Express Company, et al*; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; *Nextcard, LLC v. American Express Company, et al*; Civil Action No. 2:07-cv-354 (TJW); In the U.S. District Court for the Eastern District of Texas, Marshall Division, filed May 14, 2008 (5 pages).
Plaintiffs Second Amended Reply to Counterclaims of Defendant DFS Services LLC; *Nextcard, LLC v. American Express Company, et al*; Civil Action No. 2:07-cv-354 (TJW); In the U.S. District Court for the Eastern District of Texas, Marshall Division, filed May 14, 2008 (7 pages).
Plaintiffs Second Amended Reply to Counterclaims of Defendant American Express Company; *Nextcard, LLC v. American Express Company, et al*; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
"ESL Federal Credit Union Inaugurates Internet Target Marketing." PR Newswire p. 4210 (Oct. 6, 1998), 3 pages.
Kim S. Nash "Call all Customers." Computerworld, 32 (1), 25-28 (Dec. 1997), 2 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Welcome to Keen retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM Sigmetrics Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
International Search Report for PCT Application No. PCT/US2011/031239, mailed on Jul. 7, 2011, 3 pages.
International Search Report for PCT Application No. PCT/US2011/064946, mailed on Jun. 22, 2012, 3 pages.
International Search Report for PCT Application No. PCT/US03/41090, mailed on Sep. 1, 2004, 3 pages.
International Search Report for PCT Application No. PCT/US05/40012, mailed on Oct. 5, 2007, 2 pages.
International Preliminary Report on Patentability for PCT Application No. PCT/US2011/031239, dated Oct. 9, 2012, 8 pages.
International Preliminary Report on Patentability for PCT Application No. PCT/US2006/039630, dated Apr. 16, 2008, 4 pages.
International Search Report and Written Opinion for PCT Application No. PCT/US2013/037086, mailed Jul. 12, 2013, 9 pages.
International Search Report and Written Opinion for PCT Application No. PCT/US2013/29389, mailed Jul. 24, 2013, 8 pages.
International Search Report and Written Opinion for PCT Application No. PCT/US2013/038212, mailed Jul. 17, 2013, 11 pages.
International Search Report and Written Opinion for PCT Application No. PCT/US2013/041147, mailed Jul. 30, 2013, 9 pages.
International Search Report for PCT Application No. PCT/US2013/025142, mailed Jun. 5, 2013, 4 pages.
International Preliminary Report on Patentability for PCT Application No. PCT/US2013/025142, mailed Aug. 21, 2014, 5 pages.
Non-Final Office Action of Dec. 11, 2008 for U.S. Appl. No. 11/394,078, 15 pages.
Final Office Action of Jul. 9, 2009 for U.S. Appl. No. 11/394,078, 15 pages.
Non-Final Office Action of Jan. 28, 2010 for U.S. Appl. No. 11/394,078, 14 pages.
Final Office Action of Jul. 9, 2010 for U.S. Appl. No. 11/394,078, 16 pages.
Non-Final Office Action of Feb. 1, 2011 for U.S. Appl. No. 11/394,078, 20 pages.
Final Office Action of Aug. 2, 2011 for U.S. Appl. No. 11/394,078, 23 pages.
Non-Final Office Action of May 16, 2012 for U.S. Appl. No. 11/394,078, 23 pages.
Final Office Action of Jan. 5, 2013 for U.S. Appl. No. 11/394,078, 22 pages.
Non-Final Office Action of Jun. 22, 2012 for U.S. Appl. No. 13/080,324, 9 pages.
Non-Final Office Action of Jan. 16, 2012 for U.S. Appl. No. 12/725,999, 13 pages.
Final Office Action of Aug. 2, 2012 for U.S. Appl. No. 12/725,999, 15 pages.
Non-Final Office Action of Aug. 15, 2012 for U.S. Appl. No. 12/967,782, 31 pages.
Non-Final Office Action of Jul. 29, 2011 for U.S. Appl. No. 12/608,117, 20 pages.
Final Office Action of Apr. 4, 2012 for U.S. Appl. No. 12/608,117, 25 pages.
Non-Final Office Action of Apr. 24, 2004 for U.S. Appl. No. 09/922,753, 16 pages.
Final Office Action of Oct. 14, 2004 for U.S. Appl. No. 09/922,753, 13 pages.
Non-Final Office Action of May 17, 2005 for U.S. Appl. No. 09/922,753, 13 pages.
Non-Final Office Action of Mar. 14, 2006 for U.S. Appl. No. 09/922,753, 13 pages.
Final Office Action of Jul. 26, 2006 for U.S. Appl. No. 09/922,753, 13 pages.
Non-Final Office Action of Aug. 13, 2008 for U.S. Appl. No. 09/922,753, 10 pages.
Final Office Action of Apr. 23, 2009 for U.S. Appl. No. 09/922,753, 11 pages.
Non-Final Office Action of Jul. 21, 2009 for U.S. Appl. No. 09/922,753, 10 pages.
Final Office Action of Feb. 18, 2010 for U.S. Appl. No. 09/922,753, 9 pages.
Non-Final Office Action of Apr. 25, 2011 for U.S. Appl. No. 09/922,753, 9 pages.

(56) References Cited

OTHER PUBLICATIONS

Final Office Action of Nov. 25, 2011 for U.S. Appl. No. 09/922,753, 10 pages.
Non-Final Office Action of Aug. 7, 2007 for U.S. Appl. No. 10/980,613, 16 pages.
Non-Final Office Action of May 15, 2008 for U.S. Appl. No. 10/980,613, 23 pages.
Non-Final Office Action of Apr. 30, 2012 for U.S. Appl. No. 12/504,265, 16 pages.
Final Office Action of Aug. 28, 2012 for U.S. Appl. No. 12/504,265, 28 pages.
Final Office Action of Feb. 14, 2013 for U.S. Appl. No. 13/080,324, 11 pages.
Final Office Action of Apr. 11, 2013 for U.S. Appl. No. 12/967,782 18 pages.
Non-Final Office Action of Jun. 12, 2013 for U.S. Appl. No. 12/608,117, 56 pages.
Non-Final Office Action of Jul. 8, 2013 for U.S. Appl. No. 13/413,197, 10 pages.
Non-Final Office Action of Jun. 27, 2013 for U.S. Appl. No. 12/504,265, 11 pages.
Non-Final Office Action of Jun. 20, 2013 for U.S. Appl. No. 13/157,936, 19 pages.
Non-Final Office Action of May 10, 2013 for U.S. Appl. No. 13/563,708, 20 pages.
Non-Final Office Action of Mar. 30, 2013 for U.S. Appl. No. 11/360,530, 23 pages.
Non-Final Office Action of Oct. 30, 2013 for U.S. Appl. No. 13/961072, 10 pages.
Non-Final Office Action of Dec. 5, 2013 for U.S. Appl. No. 12/967,782, 14 pages.
Final Office Action of Oct. 21, 2013 for U.S. Appl. No. 12/504,265 14 pages.
Notice of Allowance of Jan. 3, 2014 for U.S. Appl. No. 11/360,530, 29 pages.
Final Office Action of Jan. 22, 2014 for U.S. Appl. No. 12/608,117, 45 pages.
Final Office Action of Jan. 27, 2014 for U.S. Appl. No. 13/563,708, 35 pages.
Non-Final Office Action of Jan. 30, 2014 for U.S. Appl. No. 13/413,158, 19 pages.
Notice of Allowance of Feb. 12, 2014 for U.S. Appl. No. 13/157,936, 33 pages.
Final Office Action of Feb. 19, 2014 for U.S. Appl. No. 13/961,072, 35 pages.
Non-Final Office Action of Feb. 20, 2014 for U.S. Appl. No. 10/980,613, 43 pages.
Notice of Allowance of Feb. 28, 2014 for U.S. Appl. No. 09/922,753, 13 pages.
Notice of Allowance of Mar. 25, 2014 for U.S. Appl. No. 12/504,265, 31 pages.
Notice of Allowance of Mar. 31, 2014 for U.S. Appl. No. 12/725,999, 41 pages.
Notice of Allowance of Apr. 1, 2014 for U.S. Appl. No. 13/413,197, 32 pages.
Non-Final Office Action of Jul. 17, 2014 for U.S. Appl. No. 11/394,078, 41 pages.
Non-Final Office Action of Jul. 31, 2014 for U.S. Appl. No. 13/080,324, 38 pages.
Notice of Allowance of Aug. 18, 2014 for U.S. Appl. No. 12/967,782, 43 pages.
Non-Final Office Action of Aug. 21, 2014 for U.S. Appl. No. 10/980,613, 43 pages.
Notice of Allowance of Sep. 17, 2014 for U.S. Appl. No. 13/413,158, 40 pages.
Notice of Allowance of Sep. 26, 2014 for U.S. Appl. No. 13/563,708, 14 pages.
Final Office Acton of Nov. 17, 2015 for U.S. Appl. No. 12/608,117, 32 pages.
Non-Final Office Action of Dec. 4, 2015 for U.S. Appl. No. 10/980,613, 21 pages.
Non-Final Office Action of Dec. 24, 2015 for U.S. Appl. No. 14/317,346, 15 pages.
Non-Final Office Action of Jan. 5, 2016 for U.S. Appl. No. 14/245400, 33 pages.
Notice of Allowance of Jan. 7, 2016 for U.S. Appl. No. 14/313,511, 5 pages.
First Action Interview Pilot Program Pre-Interview Communication of Jan. 12, 2016 for U.S. Appl. No. 14/753,496, 3 pages.
Notice of Allowance of Jan. 20, 2016 for U.S. Appl. No. 13/829,708, 11 pages.
Final Office Action of Jan. 29, 2016 for U.S. Appl. No. 14/711,609; 15 pages.
Final Office Action of Jan. 29, 2016 for U.S. Appl. No. 14/500,537; 15 pages.
Non-Final Office Action of Feb. 12, 2016 for U.S. Appl. No. 13/080,324, 15 pages.

* cited by examiner

OCCASIONALLY-CONNECTED COMPUTING INTERFACE

TECHNICAL FIELD

Various exemplary embodiments disclosed herein relate generally to computer-based methods and apparatuses, including computer program products, for an occasionally-connected computing interface.

BACKGROUND

Companies can use servers to provide services to remote computers (e.g., online services) through interfaces on the remote computers. For example, a user can access the services by loading a webpage on a local computer that interfaces with the servers. The webpage can include a number of controls, such as buttons, widgets, menu items, etc. that allow the user to access and interact with the remotely-located server(s) to access the full-range of services provided by the servers. As another example, the user can access the services by loading a program or other executable on the user's computer that is configured to interact with the services provided by the remotely-located servers. The executable can be similar to the webpage—the executable generates a graphical user interface (GUI) with various controls that allow the user to invoke the features of the service provided by the remote servers.

With the explosion of smart phones, personal digital assistants, tablets, and other mobile devices, the processing and display capabilities of these devices are often powerful enough to run similar executables on the mobile devices that can interface with the remote servers. However, such programs or executables often consume a large amount of the mobile device's processing power, memory, etc., causing the mobile device's performance to decrease. Further, many of these programs can not be run on earlier-model mobile devices, which do not have sufficient processing power.

SUMMARY

The computerized methods and apparatus disclosed herein allow a user to invoke the full functionality of a service (e.g., that which is often utilized using a graphical interface at the user's computer, including various buttons, menu items, etc.) using a mobile device's messaging service (e.g., MMS, SMS). The user can further seamlessly switch between using the mobile device and the user's computer to interact with the service, without any impact on the user's session with the service and/or sessions with other remote computers (e.g., existing online chat sessions between the user, whether established through the user's mobile phone or computer, and the remote computers).

In one embodiment, a computerized method is featured. The computerized method allows a user to switch between interfacing with a service through a network or through short message service (SMS). The method includes executing, by a server computer, a chat service through which a first user at a first computer can communicate directly with a second user at a second computer, both the first computer and the second computer communicating with the chat service through a network. The method includes receiving from the first computer, by the server computer, a request to enable the first user to interface with the chat service through a mobile device of the first user using short message service (SMS) instead of through the network using the first computer. The method includes configuring, by the server computer, the chat service to interface with the mobile device through SMS, including (a) communicating chat information through SMS to the first user's mobile device and communicating chat information through the network to the second computer such that the second user is unaware the first user switched to using the mobile device instead of the first computer, and (b) communicating control information through SMS to the first user's mobile device such that the first user can control a full functionality of the chat service using SMS.

In another embodiment, a computer program product, tangibly embodied in a non-transitory computer-readable medium is featured. The computer program product includes instructions being configured to cause a data-processing apparatus to execute a chat service through which a first user at a first computer can communicate directly with a second user at a second computer, both the first computer and the second computer communicating with the chat service through a network. The computer program product includes instructions being configured to cause a data-processing apparatus to receive from the first computer a request to enable the first user to interface with the chat service through a mobile device of the first user using short message service (SMS) instead of through the network using the first computer. The computer program product includes instructions being configured to cause a data-processing apparatus to configure the chat service to interface with the mobile device through SMS, including (a) communicating chat information through SMS to the first user's mobile device and communicating chat information through the network to the second computer such that the second user is unaware the first user switched to using the mobile device instead of the first computer, and (b) communicating control information through SMS to the first user's mobile device such that the first user can control a full functionality of the chat service using SMS.

In another embodiment, a server computer is featured. The server computer allows a user to switch between interfacing with a service through a network or through short message service (SMS). The server computer includes a processor and memory. The server computer is configured to execute a chat service through which a first user at a first computer can communicate directly with a second user at a second computer, both the first computer and the second computer communicating with the chat service through a network. The server computer is configured to receive from the first computer a request to enable the first user to interface with the chat service through a mobile device of the first user using short message service (SMS) instead of through the network using the first computer. The server computer is configured to configure the chat service to interface with the mobile device through SMS, including (a) communicating chat information through SMS to the first user's mobile device and communicating chat information through the network to the second computer such that the second user is unaware the first user switched to using the mobile device instead of the first computer, and (b) communicating control information through SMS to the first user's mobile device such that the first user can control a full functionality of the chat service using SMS.

In other examples, any of the aspects above can include one or more of the following features. A request can be received from the first user's mobile device to interface with the chat service at a third computer instead of the mobile device, and the chat service can be configured to interface with the third computer. Configuring can include (a) communicating chat information through the network to the third computer and communicating chat information through the network to the second computer such that the second user is unaware that the first user switched to using the third computer instead of the mobile device, and (b) communicating control information through the network to the third computer such that the first user can use the full functionality of the chat service using the network.

In some examples, configuring the chat service to interface with the first user includes maintaining any chat sessions between the first user and the second user, any other users, or any combination thereof. Receiving the request can include receiving a request from the first user to change a status of the first user from online mode to mobile mode. All communications can be sent to the first user's mobile device using SMS.

In other examples, an SMS request is received from the first user's mobile device to start a chat conversation with a third user at a third computer, and chat information is communicated through SMS to the first user's mobile device and communicating chat information to the third computer. Communicating chat information through SMS to the first computer can include receiving a chat message from the second computer, and transmitting, using SMS, the chat message, and a chat identifier to the first user's mobile device.

The techniques, which include both methods and apparatuses, described herein can provide one or more of the following advantages. A service (e.g., provided by a server) can be accessed by a broad range of devices and communication protocols, including a mobile phone's messaging service. The user of the service can seamlessly switch between devices while interacting with the service, giving the user a greater flexibility to stay connected to the service using different devices and communication protocols. Additionally, by using a messaging service on the mobile device instead of a stand-alone application or executable, the user can continue using the full-range of services without bogging down the resources of the mobile device.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages will be more fully understood from the following description of various embodiments, when read together with the accompanying drawings.

FIG. 4 illustrates an exemplary diagram of an agent console for accessing services provided by a remote server.

DETAILED DESCRIPTION

Figure 1:
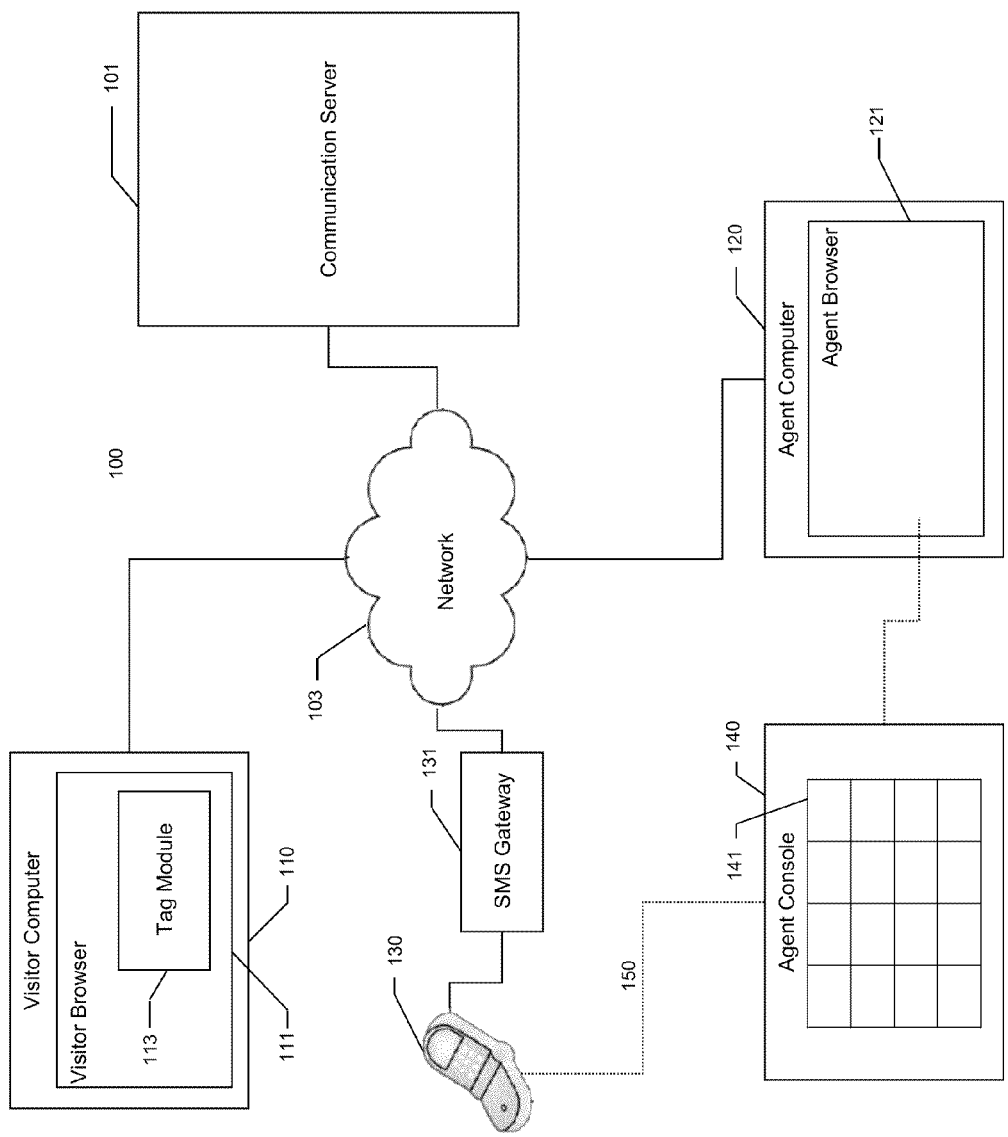
FIG. 1 illustrates an exemplary system for supporting an occasionally-connected computing interface.

Referring now to the drawings, in which like numerals refer to like components or steps, there are disclosed broad aspects of various exemplary embodiments.

In general overview, computerized systems and methods are provided for allowing a user to switch between interfacing with a service (e.g., a service provided by a remotely-located server) through a device networked to the service (e.g., a desktop, personal computer, laptop, etc. connected to the server via the internet or other type of network) or a mobile device using the mobile device's message service (e.g., short messaging service, blackberry messaging service, etc.). Further, the user can access the full range of services provided by the remote computer using the mobile device's messaging service.

While various examples described herein use the term "agent," the term is intended to be used broadly and should be understood to refer to a user of the services (e.g., provided by a remote server). Therefore, the phase "occasionally-connected user interface" addresses an interface that allows a user of a service to interface with the service using various devices (e.g., the agent can connect to the services using his desktop, mobile phone, and/or other devices via different communication interfaces).

FIG. 1 illustrates an exemplary system 100 for supporting an occasionally-connected user interface. The system 100 includes multiple components connected through the network 103. The system 100 includes a communication server 101, a visitor's computer 110, an agent computer 120, a mobile device 130, an SMS gateway 131, and an agent console 140. The visitor's computer 110 can include a (visitor's) web browser 111 and a tag module 113. The agent computer 120 can similarly include a (n agent) web browser 121. The browser 121 can display the agent console 140, which can include an interface 141 that provides a set of features to the agent.

The communication server 101 provides a number of services to remote users (e.g., agent computer 120, via the agent console 140, mobile device 130, etc.). The agent can interact with the services to establish communications with the visitor computer 110 (and/or other visitors, not shown). For example, the communication server 101 can initiate a connection between an agent (e.g., using the agent computer 120) and a website visitor (e.g., using the visitor computer 110) through the network 103. For example, the communication server 101 can initiate an online chat session between the visitor computer 110 and either the mobile device 130 (used by the agent) or the agent computer 120 (used by the agent). Over the course of the chat session, the agent can seamlessly switch, via the communication server 101, which device the agent is using to communicate with the visitor computer (e.g., switch from using the agent computer 120 to chat with the visitor computer 110, to using the mobile device 130) such that the visitor does not detect the agent's change of device (e.g., as indicated with dotted line 150).

Communication server 101 can be, for example, a single web server with a processor and memory. In some embodiments, the communication server 101 can include multiple web servers connected directly or through the network 103. The communication server 101 can be configured to provide a number of services to users (e.g., to agent computer 120 and/or other agent computers, not shown). The services can include, for example, services that allow the agent to provide customer service, help, and/or recommendations to the visitors (e.g., visitors to a website) and to manage the associated connections with visitors. For example, the communication server 101 can establish a communication between the visitor computer 110 and the agent computer 120. For example, the communication server 101 can establish an online chat help session between the agent computer 120 and the visitor computer 110 (e.g., in response to a visitor clicking a chat button on a web page displayed in the visitor browser 111, automatically based on predetermined criteria configured in the tag module 113, etc.).

The communication server 101 can be configured to provide certain functionality to the agent through the agent console 140 via the set of features 141. For example, if an agent types a message using the agent console 140 to send to a visitor, the communication server 101 can process the agent's actions and transmit the message to the visitor (e.g., via a an online chat session established by the communication server 101). The agent console 140 is described in further detail below. The communication server 101 is further configured to provide the same functionality to the agent through the agent's mobile device using a messaging service.

Network 103 can be, for example, a packet-switching network that is able to forward packets to other devices based on information included in the packet. The network 103 can provide, for example, phone and/or Internet service to various devices, like the user device 101 and the agent computer 120 in communication with the network 103.

The visitor computer 110 can be a personal computer (e.g., a PC or a laptop) including a processor and memory. In some examples, the visitor computer 110 is a smart phone, a personal digital assistant, a tablet PC, and/or any another computing device capable of interacting with the communication server 101. In some examples, the visitor computer 110 is a computing device capable of viewing web content using a web browser (e.g., the visitor browser 111). The web content can be served by one or more web content servers (not shown). The web content can cause the tag module 113 to be loaded in the visitor browser 111, as is described, for example, in U.S. patent application Ser. No. 13/080,324, entitled "System and Method for Dynamically Enabling Customized Web Content and Applications," which is hereby incorporated by reference herein in its entirety.

Agent computer 120 can be a personal computer with a processor and memory that is sufficient to execute the agent console 140 (e.g., through the agent browser 121 as a web application, or as a stand-alone application on the agent computer 120). Mobile device 130 can be, for example, a phone, tablet, or similar portable device that is able to send and receive messages. In some embodiments, the mobile device 130 is a device capable of sending and receiving text messages through a messaging service, such as the short messaging service (SMS).

The agent console 140 is, for example, an interface that allows the agent (using the agent computer 120) to perform various functions by accessing services provided by the communication server 101. These functions can be related to interacting with visitors. For example, the functions can include (i) monitoring a number of visitors (e.g., visitors to a website) that have requested assistance from agents (and the status thereof, such as chatting, waiting for chat, etc.), (ii) chatting with a particular visitor, (iii) placing an outbound call to the visitor, (iv) emailing with a visitor, (v) drafting notes (e.g., to associate with a visitor (such as notes about a chat or call) or for the agent's use), (vi) viewing alerts presented to the visitor (e.g., pop-up ads, invitations for online chat, etc.), (vii) controlling a ticket associated with a visitor (e.g., to track the progress of agent interaction with a visitor), (viii) viewing the web history of the visitor, and/or the like.

Figure 4:
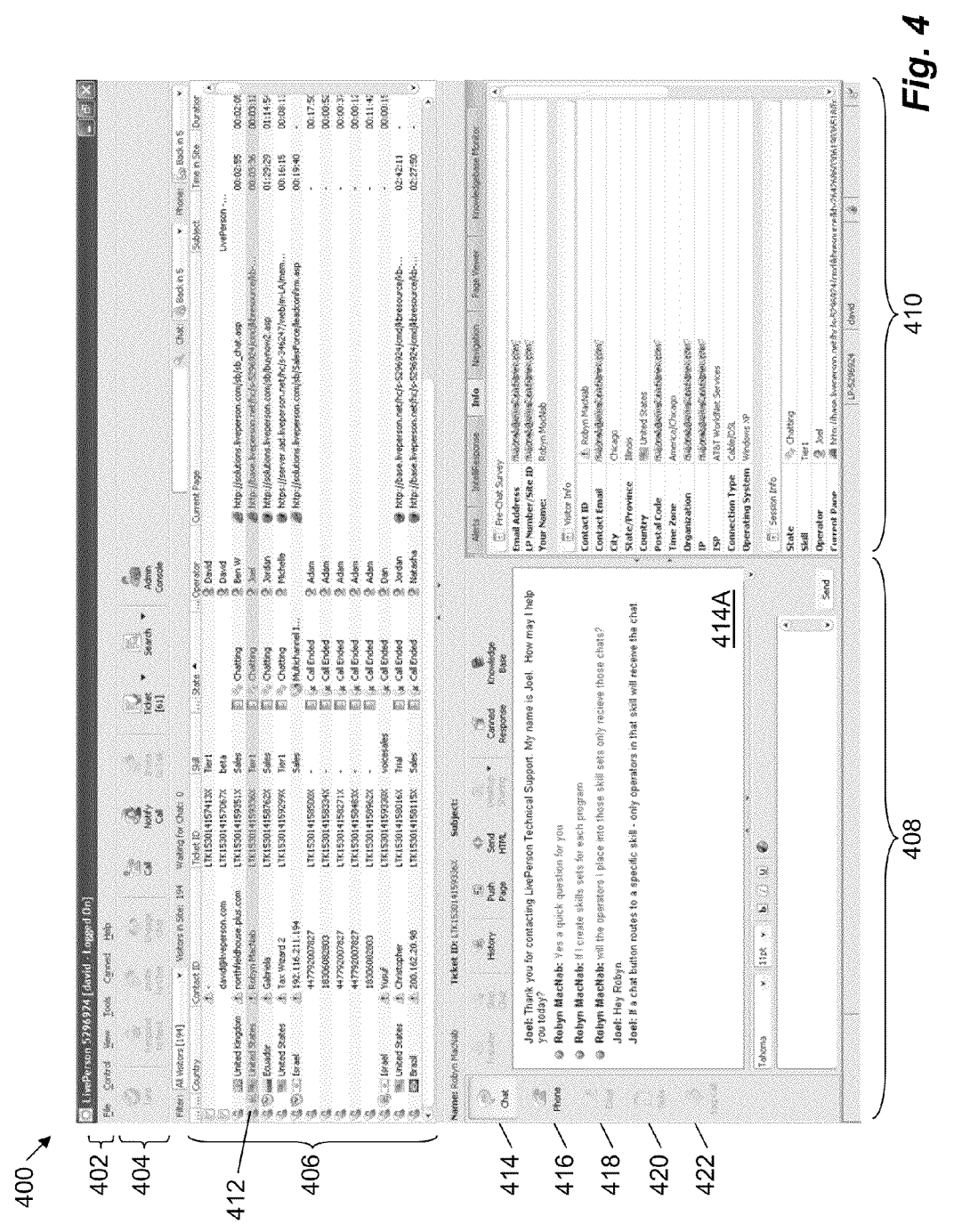

FIG. 4 shows an example of an agent console 400. The agent console 400 includes a menu bar 402, an action bar 404, a visitor list 406, an interaction portion 408, and an information portion 410. The visitor list 406 provides information for visitors (e.g., that are in-line to interact with an agent, or being assisted by an agent), including their country, contact ID, ticket ID, skill, state, operator, current web page, subject, time in the website, and duration of the interaction with an agent). An agent can select a particular visitor in the visitor list, as shown by the highlighted visitor 412 with a contact ID "Robyn MacNab." Once selected, the interaction portion 408 and information portion 410 are populated with information for the visitor 412, as shown in the agent console 400.

The interaction portion 408 includes a chat function 414 that allows the agent to chat with the selected visitor (e.g., as shown in the chat console 414A), a phone function 416 that allows the agent to call the visitor, an email function 418 that allows the agent to email with the visitor, a note function 420 that allows the agent to take notes, and a log call function 422 that allows the agent to log information about a call (e.g., made with the phone function 416). The information portion 410 includes various tabs that provide information about a selected visitor, including alerts, InteliResponse, Info, Navigation, Page Viewer, and Knowledgebase Monitor. For example, the information tab 410A shows various information for the selected visitor Robyn MacNab 412. Agent console 400 is an illustrative example of an agent console, and one of skill in the art can appreciate that different features can be included and/or excluded from the agent console without departing from the spirit of the invention.

The system 100 is an example of a computerized system that is specially configured to perform the computerized methods described herein. However, the system structure and content recited with regard to FIG. 1 are for exemplary purposes only and are not intended to limit other examples to the specific structure shown in FIG. 1. As will be apparent to one of ordinary skill in the art, many variant system structures can be architected without departing from the computerized systems and methods described herein.

In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 2:
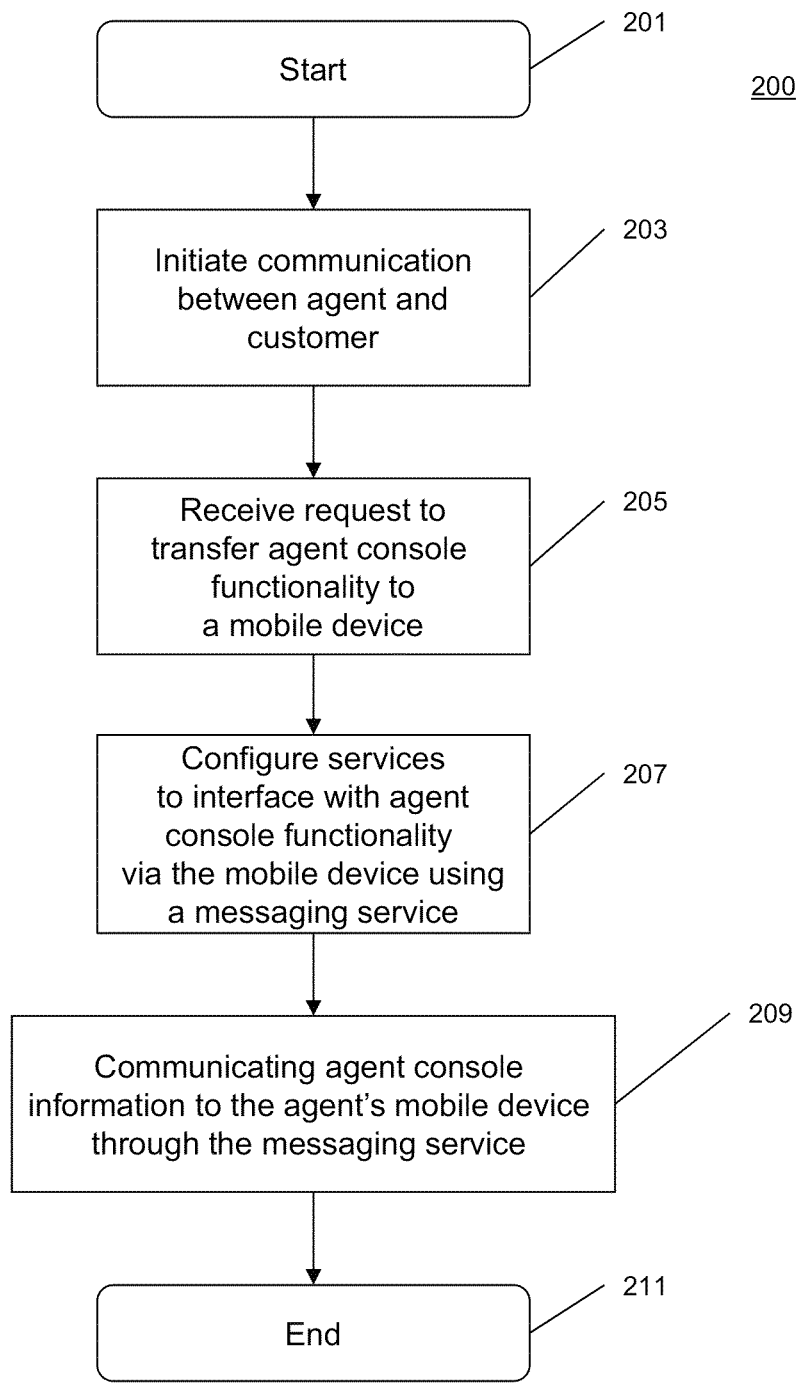
FIG. 2 illustrates an exemplary computerized method for allowing a user to switch between interfacing with a service through a networked device or a mobile device using the mobile device's message service.

FIG. 2 illustrates an exemplary computerized method 200 for allowing a user (e.g., an agent) to switch between interfacing with a service (e.g., provided by the communication server 101) through a network (e.g., over the network 103 via the agent console 140) or message service (e.g., via mobile device 130). Referring to FIG. 1, the communication server 101 can execute method 200 to switch devices when supporting a communication between the agent (e.g., the agent via the agent console 140 on agent computer 120) and the visitor's computer 110. Method 200 starts at step 201 and proceeds to step 203, where the communication server 101 initiates a communication (e.g., a chat session) between the agent and the customer. At step 205, the communication server 101 receives (e.g., from the agent console 140) a request to transfer the agent from using the agent console 140 to communicate with the visitor, to using a mobile device 130 to communicate with the visitor (e.g., such that the user can invoke the functionality of the agent console 140 using the mobile device). At step 207, the communication server 101 configures the communication service(s) to interface with the mobile device through a messaging service, such that the agent can invoke functionality of the agent console (e.g., the same functionality provided through the agent console 140). At step 209, the communication server 101 communicates agent console information to the agent's mobile device through the messaging service.

While method 200 is described with step 203, the agent need not have a communication initiated between the agent and a customer to switch the agent's device (e.g., as described with reference to steps 205-209). Referring to step 203, for example, the communication server 101 can set up an online chat between the agent computer 120 and the visitor at the visitor computer 110. The communication server 101 can set up the chat session such that both the agent computer 120 and the visitor computer 110 communicate through the network 103. For example, the communication server 101 can provide a chat window to the visitor through the visitor browser 111 for the visitor to participate in the chat session. The agent can use the agent console 140 to participate in the chat session (e.g., using the chat function 414 of the agent console 400 shown in FIG. 4).

Referring to step 205, the agent can indicate (e.g., via the agent console 140) that the agent would like to switch to interacting with the agent console functionality through mobile device 130 instead of through the agent computer 120. For example, the communication server 101 receives, from the agent computer 120 (e.g., via user selection of a function on the agent console 140), a request to enable the agent to interface with the services provided by the communication server 101 through the mobile device 130 (e.g., using short message service (SMS)) instead of through the agent computer 120 (e.g., using the agent console 140).

For example, the communication server 101 can receive a request from the agent console 140 to change a status of the agent using the agent computer 120 from "online" mode (e.g., connected to the communication server 101 via a computer network) to "mobile" mode (e.g., connected to the communication server 101 via a network that includes telephone components, such as SMS gateway 131). The communication server 101 can allow the user to access the agent console functionality (e.g., as provided by the communication server 101) through SMS messaging (e.g., for both messages being sent to the communication server 101 and transmitted from the communication server 101 to the mobile device 130).

In some embodiments, the communication server 101 can receive the request from the agent computer 120. In such examples, the communication server 101 can first suspend messages from being sent to the agent computer 120 before proceeding to step 207. In some embodiments, the communication server 101 receives the transfer request from the mobile device 130 (e.g., as is described below with respect to FIG. 3). In such examples, the communication server 101 can proceed directly to step 207.

The agent can request the transfer using the agent console 140. For example, the agent can change a status associated with the agent from "online" to "mobile" to switch to using the mobile device 130. In response, the communication server 101 can switch to interacting with the mobile device 130 via SMS (e.g., all communications, such as chat messages and control information, are transmitted to the mobile device 130 via SMS). If, for example, the agent has incoming chats, the communication server 101 can support multiple chats via SMS capabilities.

Referring to step 207, the communication server 101 configures the services it is providing to interface with the agent via the mobile device 130. In some examples, the communication server 101 includes an application programmer interface (API) that is used to invoke the services provided by the communication server 101. The communication server 101 can configure the API, if necessary, to interface with the mobile device 130 instead of the agent console 140.

In some examples, the communication server 130 interfaces with the mobile device 130 through SMS. For example, when the communication server 101 receives the transfer request in step 205, the communication server 101 can establish a connection between the visitor's computer 110 and the mobile device 130 via the SMS gateway 131.

By using SMS instead of a stand-alone application or program allows the user to continue using the full-range of services provided by the communication server 130 without bogging down the resources of the mobile device 130. While some examples herein describe using SMS as the messaging service, other messaging services can also be used. For example, depending on the type of mobile device 130 used (e.g., iPhone, iPad, Blackberry, Android) the communication server 101 can transmit messages using the specific messaging service employed by the mobile device 130. For example, the messaging can be performed using Java, Blackberry Messenger (BBM), multimedia messaging service (MMS), and/or other services that do not require running a separate program or executable on the mobile device 130.

The information the communication server 101 transmits to the mobile device 130 can include identifiers for the information. The identifiers can allow the agent to understand the meaning of the information as it relates to services provided by the communication server 101 (e.g., whether the information relates to chat, relates to control functions, etc.). For example, for chat sessions, each message can be prefixed with the chat number (e.g., "chat 1", "chat 2", etc.), a chat name (e.g., "Robyn MacNab" as shown in FIG. 4), or other identifier. The identifiers can allow the agent to distinguish between different chats, and to identify the chats when switching back to using the agent computer 120. Similarly, messages transmitted from the mobile phone 130 to the communication server 101 can include an identifier that the communication server 101 uses to process the messages. The identifiers can be used so the mobile phone 130 can use the full range of services offered by the communication server 101 (e.g., as if using the agent console 140) from the mobile device 130. For example, functions the agent can use via the mobile device 130 (e.g., via messaging without installing a stand-alone application) include searching for a visitor, sending a chat invites to a visitor (e.g., while the visitor is on a website), requesting and receiving a real-time administrative report about the agent's account with the communication server (e.g., to get information such as that shown in the visitor list 406, such as which chat sessions are available and which agent(s) are interacting with visitors), and/or other functionality (e.g., such as that which can be utilized through the agent console 400).

Referring to step 209, the communication server 101 communicates agent console information to the agent's mobile device 130 through the messaging service. The information can include, for example chat information. The communication server 101 can perform step 207 such that step 209 occurs without any impact on the visitor. For example, the communication server 101 can transition to communicating with the agent's mobile device 130 through SMS while still communicating information (e.g., chat information) through the network 100 to the visitor computer 110 such that the visitor is unaware the agent switched to using the mobile device 130 instead of the agent computer 120.

The information can include control information. For example, the communication server 101 can communicate control information through SMS to the mobile device 130 such that the agent can use the full functionality provided by the communication server 101 (e.g., that explained with reference to the agent console 400 FIG. 4) using SMS. For example, the control information can allow the agent to (i) monitor visitors (e.g., visitors to a website), (ii) establish a chat with a particular visitor, (iii) place an outbound call to the visitor, (iv) email with a visitor, (v) draft notes, (vi) view alerts presented to the visitor, (vii) control a ticket associated with a visitor, (viii) viewing the web history of the visitor, and/or other functions (e.g., as described with reference to FIG. 4).

For example, the agent can start a new online chat with a new visitor via the agent's mobile device 130. Using SMS for this example, the communication server 101 receives an SMS request from the agent's mobile device 130 to start a chat conversation with the new user (e.g., using a second visitor computer (not shown). The communication server 101 can communicating chat information through SMS to the agent's mobile device 130 and communicate chat information to the visitor computer 110. For example, the communication server 101 can receive a chat message from the visitor computer 110 with a destination address being that of the agent. The communication server 101 can determine that the agent is using the mobile device 130, and transmit, using SMS, the chat message, and a chat identifier to the first user's mobile device. The agent can use the chat identifier to know which visitor transmitted the chat message. The communication server 101 can receive both chat messages sent from the mobile device 130, as well as control messages from the mobile device 130 (e.g., via the gateway 131) in order to provide the agent full functionality of the agent console from the mobile device 130.

Figure 3:
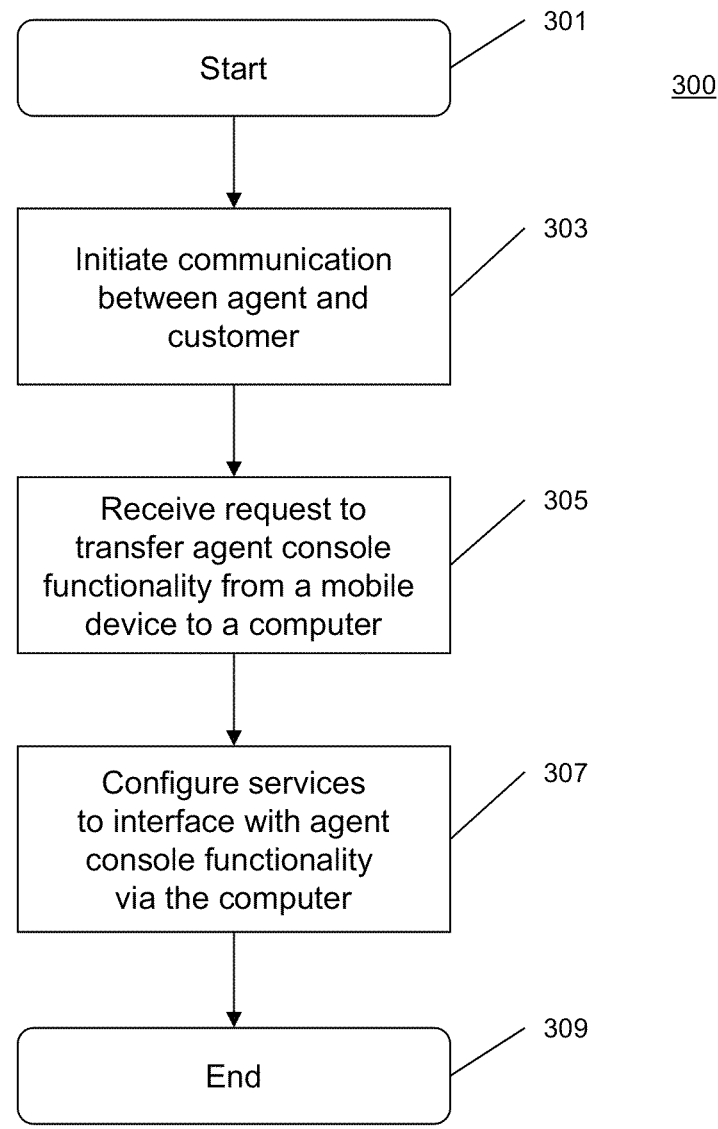
FIG. 3 illustrates an exemplary computerized method for allowing a user to switch between interfacing with a service through a networked device or a mobile device using the mobile device's message service.

FIG. 3 illustrates an exemplary computerized method 300 for allowing a user to switch between interfacing with a service through a network or message service. Referring to FIG. 1, method 300 starts at step 301 and proceeds to step 303, where the communication server 101 initiates a communication (e.g., a chat service) between the agent's mobile device 130 and the visitor computer 110. For example, the communication server 101 can initiate a chat session by invoking a chat service on both the mobile device 130 (e.g., via SMS) that is controlled by the agent and the visitor's computer 110 (e.g., via a graphical chat window).

At step 305, the communication server 101 receives a request to transfer the agent's interaction with the agent console functionality from the mobile device 130 (e.g., via SMS messaging) to the agent computer 120 (or another computer, not shown). For example, if the agent is communicating with the visitor via online chat, the communication server 101 can receive a request from the agent's mobile device 130 to maintain the chat service with the visitor, but to interface with the chat service at the agent computer 120 instead of the mobile device 130.

At step 307, the communication server 101 configures the services to interface with the agent at the agent computer 120. For example, to maintain an existing chat with the visitor computer 110 during the transfer, the communication server 101 can configure the chat service to interface with the agent console 104 being executed on the agent computer 120 (e.g., via the chat console 414A of FIG. 4). The communication server 101 can communicate chat information through the network 103 to the agent computer 120 and communicate chat information through the network 103 to the visitor computer 110 such that the visitor is unaware that the agent switched to using the agent computer 120 instead of the mobile device 130 (e.g., the visitor does not have any concept of what device the agent is using to communicate with the visitor). The communication server 101 can communicate control through the network 103 to the agent computer such that the first user can use the full functionality of the chat service using the network.

The communication server 101 can allow the agent to interface with the services provided by the communication server 101 while preserving any settings, communications, etc. that the agent has configured via one or more devices. For example, if a user invokes a first setting while using the mobile device 130, and then invokes a second setting after switching to the agent computer 120, the agent still has the first setting configured by the mobile device 130. Additionally, the communication server 101 can maintain any communications between the agent and third parties (e.g., the visitor computer 110 and/or any other computers). For example, the communication server 101 can maintain any existing chat sessions between the agent and the visitor computer 110 and/or any other users.

Allowing the agent to interface with the agent console functionality through the mobile device 130 using a messaging service can increase performance of the mobile device 130. For example, requiring the mobile device 130 to run an application (e.g., as an app for an iPhone, which controls and manages all the calls to the communication server 101 (e.g., in order to receive notifications and incoming chat)) instead of using a messaging service (e.g., SMS) would consume a lot of the mobile phone's resources. The communication server 101 can provide access to the full agent console functionality via messaging, which does not consume much resources of the mobile device 130.

As an illustrative example, assume the agent is a car dealer, and the agent is in his office chatting with potential customers online. Then the car dealer notices a person browsing the vehicles in his lot, and needs to leave his computer to assist the customer. To maintain the chats with the online customers, the car dealer sets his profile to "mobile," (e.g., using the agent console 400 of FIG. 4) and enters his phone number as a mobile address at which to communicate with the car dealer. Once the car dealer adjusts his profile, he can go out to his lot and get SMS notification(s) for any incoming chat(s), and/or use SMS messages to control other aspects of the service. If, for example, the SMS notification is a request to chat with a new customer that the car dealer was not already chatting with, the car dealer can reply via SMS to take the new conversation. The chat console 101 then sends the agent's mobile device the chat (e.g., "Good afternoon, can I get pricing on a new Toyota?"). If the car dealer finishes helping the customer on the lot, the car dealer can go back inside to his desktop, and continue his chat(s) from his desktop. Thus, SMS on the mobile phone operates like a "light" console to the services provided by the communication server 101. It doesn't take any resources of your mobile device, but keeps you updated and connected always.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computer-implemented method, comprising:
 receiving a chat activation message indicating a request to activate a chat communication involving a selected customer, wherein the selected customer is associated with a customer computing device, and wherein the chat activation message is initiated when a selectable feature on a customer service interface is selected;
 facilitating network chat communications between computing devices over a network when the chat activation message is received, wherein one of the computing devices is the customer computing device;
 receiving a chat transfer message, wherein the chat transfer message includes information identifying a mobile communications device and a request to transfer the network chat communications to the mobile communications device;

receiving a communication;

determining that the communication is associated with mobile chat communications between the mobile communications device and the customer computing device;

configuring the communication for transmission using a message service, wherein configuring the communication includes associating the information identifying the mobile communications device with the received communication; and transmitting the configured communication, wherein the configured communication is addressed to the mobile communications device, wherein the configured communication is transmitted using the message service, and wherein transmitting the configured communication facilitates the mobile chat communications between the mobile communications device and the customer computing device.

2. The method of claim 1, wherein transmitting the configured communication includes transmitting the received communication to the mobile communications device using short message service (SMS).

3. The method of claim 2, wherein transmitting the received communication to the mobile communications device includes routing the received communication through an additional network and a short message service (SMS) gateway.

4. The method of claim 1, further comprising:

receiving an additional chat activation message indicating a request to activate a chat communication involving an additional customer, wherein the additional customer is associated with an additional customer computing device, and wherein the additional chat activation message is initiated when an additional selectable feature on the customer service interface is selected; and relaying chat communications between the mobile communications device and the additional customer computing device when the additional chat activation message is received.

5. The method of claim 1, further comprising:

causing a phone call activation feature to be displayed at the customer service interface;

causing the phone call activation feature to be provided at the mobile communications device;

receiving a phone call activation request transmitted by the mobile communications device, wherein the phone call activation request is transmitted by the mobile communications device upon receiving an input representing a selection of the phone call activation feature, and wherein the phone call activation request indicates a request to activate telephone communications involving an additional customer; and relaying telephone communications between the mobile communications device and a communications device operated by the addition customer when the phone call activation request is received.

6. The method of claim 5, wherein the method is used to provide a customer service involving agent interactions with remote customers, wherein the interactions involve use of chat communications.

7. The method of claim 1, further comprising receiving a communication from the mobile communications device and forwarding the received communication to the customer computing device.

8. A system, comprising:

one or more data processors; and a non-transitory computer-readable storage medium containing instructions which, when executed on the one or more data processors, cause the one or more data processors to perform operations including:

receiving a chat activation message indicating a request to activate a chat communication involving a selected customer, wherein the selected customer is associated with a customer computing device, and wherein the chat activation message is initiated when a selectable feature on a customer service interface is selected;

facilitating network chat communications between computing devices over a network when the chat activation message is received, wherein one of the computing devices is the customer computing device;

receiving a chat transfer message, wherein the chat transfer message includes information identifying a mobile communications device and a request to transfer the network chat communications to the mobile communications device;

receiving a communication;

determining that the communication is associated with mobile chat communications between the mobile communications device and the customer computing device;

configuring the communication for transmission using a message service, wherein configuring the communication includes associating the information identifying the mobile communications device with the received communication; and transmitting the configured communication, wherein the configured communication is addressed to the mobile communications device, wherein the configured communication is transmitted using the message service, and wherein transmitting the configured communication facilitates the mobile chat communications between the mobile communications device and the customer computing device.

9. The system of claim 8, wherein transmitting the configured communication includes transmitting the received communication to the mobile communications device using short message service (SMS).

10. The system of claim 9, wherein transmitting the received communication to the mobile communications device includes routing the received communication through an additional network and a short message service (SMS) gateway.

11. The system of claim 8, further comprising:

receiving an additional chat activation message indicating a request to activate a chat communication involving an additional customer, wherein the additional customer is associated with an additional customer computing device, and wherein the additional chat activation message is initiated when an additional selectable feature on the customer service interface is selected; and relaying chat communications between the mobile communications device and the additional customer computing device when the additional chat activation message is received.

12. The system of claim 8, further comprising:

causing a phone call activation feature to be displayed at the customer service interface;

causing the phone call activation feature to be provided at the mobile communications device;

receiving a phone call activation request transmitted by the mobile communications device, wherein the phone call activation request is transmitted by the mobile communications device upon receiving an input representing a selection of the phone call activation feature, and wherein the phone call activation request indicates a request to activate telephone communications involving an additional customer; and relaying telephone communications between the mobile communications device and a communications device operated by the addition customer when the phone call activation request is received.

13. The system of claim 12, wherein the method is used to provide a customer service involving agent interactions with remote customers, wherein the interactions involve use of chat communications.

14. The system of claim 8, further comprising receiving a communication from the mobile communications device and forwarding the received communication to the customer computing device.

15. A computer-program product tangibly embodied in a non-transitory machine-readable storage medium, including instructions configured to cause a data processing apparatus to perform operations including:

receiving a chat activation message indicating a request to activate a chat communication involving a selected customer, wherein the selected customer is associated with a customer computing device, and wherein the chat activation message is initiated when a selectable feature on a customer service interface is selected;

facilitating network chat communications between computing devices over a network when the chat activation message is received, wherein one of the computing devices is the customer computing device;

receiving a chat transfer message, wherein the chat transfer message includes information identifying a mobile communications device and a request to transfer the network chat communications to the mobile communications device;

receiving a communication;

determining that the communication is associated with mobile chat communications between the mobile communications device and the customer computing device;

configuring the communication for transmission using a message service, wherein configuring the communication includes associating the information identifying the mobile communications device with the received communication; and transmitting the configured communication, wherein the configured communication is addressed to the mobile communications device, wherein the configured communication is transmitted using the message service, and wherein transmitting the configured communication facilitates the mobile chat communications between the mobile communications device and the customer computing device.

16. The computer-program product of claim 15, wherein transmitting the configured communication includes transmitting the received communication to the mobile communications device using short message service (SMS).

17. The computer-program product of claim 16, wherein transmitting the received communication to the mobile communications device includes routing the received communication through an additional network and a short message service (SMS) gateway.

18. The computer-program product of claim 15, further comprising:

receiving an additional chat activation message indicating a request to activate a chat communication involving an additional customer, wherein the additional customer is associated with an additional customer computing device, and wherein the additional chat activation message is initiated when an additional selectable feature on the customer service interface is selected; and relaying chat communications between the mobile communications device and the additional customer computing device when the additional chat activation message is received.

19. The computer-program product of claim 15, further comprising:

causing a phone call activation feature to be displayed at the customer service interface;

causing the phone call activation feature to be provided at the mobile communications device;

receiving a phone call activation request transmitted by the mobile communications device, wherein the phone call activation request is transmitted by the mobile communications device upon receiving an input representing a selection of the phone call activation feature, and wherein the phone call activation request indicates a request to activate telephone communications involving an additional customer; and relaying telephone communications between the mobile communications device and a communications device operated by the addition customer when the phone call activation request is received.

20. The computer-program product of claim 19, wherein the method is used to provide a customer service involving agent interactions with remote customers, wherein the interactions involve use of chat communications.

21. The computer-program product of claim 15, further comprising receiving a communication from the mobile communications device and forwarding the received communication to the customer computing device.

* * * * *